US011339019B2

(12) United States Patent
Hall et al.

(10) Patent No.: US 11,339,019 B2
(45) Date of Patent: May 24, 2022

(54) MULTI-SHEET HANDLING FOR DOCUMENT DIGITIZATION

(71) Applicant: RIPCORD INC., Hayward, CA (US)

(72) Inventors: Kevin Christopher Hall, Hayward, CA (US); Jens Jordan Hurley, Hayward, CA (US); Jonathan Floyd Grubb, Hayward, CA (US); Joseph David Dills Hartnagle, Hayward, CA (US); Arthur Joseph Petron, Hayward, CA (US); Alex Fielding, Hayward, CA (US); Kevin Jon Olson, Turtle Lake, WI (US)

(73) Assignee: RIPCORD INC., Hayward, CA (US)

( * ) Notice: Subject to any disclaimer, the term of this patent is extended or adjusted under 35 U.S.C. 154(b) by 91 days.

(21) Appl. No.: 16/571,424

(22) Filed: Sep. 16, 2019

(65) Prior Publication Data

US 2020/0079608 A1    Mar. 12, 2020

Related U.S. Application Data

(63) Continuation of application No. PCT/US2018/023641, filed on Mar. 21, 2018.
(Continued)

(51) Int. Cl.
*B65H 7/14* (2006.01)
*H04N 1/00* (2006.01)
*B65H 7/20* (2006.01)

(52) U.S. Cl.
CPC .............. *B65H 7/14* (2013.01); *B65H 7/20* (2013.01); *H04N 1/00705* (2013.01);
(Continued)

(58) Field of Classification Search
CPC ............ B65H 2220/01; B65H 2220/03; B65H 2511/10; B65H 2511/20; B65H 2513/50;
(Continued)

(56) References Cited

U.S. PATENT DOCUMENTS 4,488,466 A    12/1984 Jones
5,019,249 A    5/1991 Sugai et al.
(Continued)

FOREIGN PATENT DOCUMENTS

CN    201741888 U    2/2011
CN    102170507 A    8/2011
(Continued)

OTHER PUBLICATIONS

U.S. Appl. No. 16/708,700 Notice of Allowance dated May 14, 2020.
(Continued)

*Primary Examiner* — Negussie Worku
(74) *Attorney, Agent, or Firm* — Wilson Sonsini Goodrich & Rosati

(57) ABSTRACT

Systems and methods are provided for document handling. Non-vision detection systems may be capable of detecting the dimensions, orientation, and/or position of a single sheet, or multiple stacked sheets. A document scanning arrangement may be capable of double sided scanning for sheets with various characteristics. The systems and methods provided may accommodate high throughput and rapid digitization of various types of documents, at a high quality.

20 Claims, 6 Drawing Sheets

Related U.S. Application Data

(60) Provisional application No. 62/474,525, filed on Mar. 21, 2017.

(52) U.S. Cl.
CPC ..... *H04N 1/00708* (2013.01); *H04N 1/00729* (2013.01); *H04N 1/00745* (2013.01); *B65H 2511/10* (2013.01); *B65H 2511/20* (2013.01); *B65H 2513/50* (2013.01); *B65H 2553/442* (2013.01)

(58) Field of Classification Search
CPC .......... B65H 2701/131; B65H 2553/30; B65H 2553/442; B65H 2553/822; B65H 2801/39; B65H 5/224; B65H 7/02; B65H 7/14; B65H 7/20; H04N 1/0057; H04N 1/00607; H04N 1/0061; H04N 1/00689; H04N 1/00692; H04N 1/00702; H04N 1/00705; H04N 1/00708; H04N 1/00721; H04N 1/00726; H04N 1/00729; H04N 1/00734; H04N 1/00745; H04N 1/00801; H04N 1/12; H04N 1/2032; H04N 2201/0081; H04N 2201/0456
USPC .......................... 271/227; 358/498, 497, 496
See application file for complete search history.

(56) References Cited

U.S. PATENT DOCUMENTS

| | | |
|---|---|---|
| 5,087,027 A | 2/1992 | Acquaviva |
| 5,093,674 A | 3/1992 | Storlie |
| 5,203,554 A | 4/1993 | Suzuki et al. |
| 5,274,418 A | 12/1993 | Kazami et al. |
| 5,377,022 A | 12/1994 | Street et al. |
| 5,458,232 A | 10/1995 | Novak et al. |
| 5,501,571 A | 3/1996 | Van et al. |
| 5,568,281 A | 10/1996 | Kochis et al. |
| 5,592,576 A | 1/1997 | Hayashi |
| 5,835,839 A | 11/1998 | Kaneda |
| 5,847,405 A | 12/1998 | Acquaviva et al. |
| 6,059,284 A * | 5/2000 | Wolf ...................... B65H 5/062 271/227 |
| 6,074,334 A | 6/2000 | Mennie et al. |
| 6,196,393 B1 | 3/2001 | Kruk, Jr. et al. |
| 6,344,902 B1 | 2/2002 | Duke et al. |
| 6,476,376 B1 | 11/2002 | Biegelsen et al. |
| 6,574,014 B2 | 6/2003 | Mandel et al. |
| 6,606,171 B1 | 8/2003 | Renk et al. |
| 6,955,348 B2 | 10/2005 | Koga et al. |
| 7,069,278 B2 | 6/2006 | Telkowski et al. |
| 7,561,738 B2 | 7/2009 | Zou et al. |
| 7,734,446 B2 | 6/2010 | Squibbs et al. |
| 7,867,593 B2 | 1/2011 | Hoshino et al. |
| 8,414,993 B2 | 4/2013 | Nakazono et al. |
| 8,693,043 B2 | 4/2014 | Schmidtler et al. |
| 9,068,920 B2 | 6/2015 | Churilla et al. |
| 9,460,356 B2 | 10/2016 | Irons et al. |
| 9,886,436 B2 | 2/2018 | Ghatage et al. |
| 10,187,542 B1 | 1/2019 | Fielding et al. |
| 10,267,750 B2 | 4/2019 | Vild et al. |
| 10,289,930 B2 | 5/2019 | Vild et al. |
| 10,307,982 B2 | 6/2019 | Adams et al. |
| 10,442,644 B1 * | 10/2019 | Zakharov ................ B65H 3/06 |
| 10,720,765 B2 | 7/2020 | Serdynski et al. |
| 2002/0111960 A1 | 8/2002 | Irons et al. |
| 2003/0168308 A1 | 9/2003 | Maier et al. |
| 2004/0022563 A1 | 2/2004 | Maruchi et al. |
| 2004/0187579 A1 | 9/2004 | Yabuta et al. |
| 2004/0207707 A1 | 10/2004 | Ohashi et al. |
| 2004/0252355 A1 | 12/2004 | Chen |
| 2005/0087422 A1 * | 4/2005 | Maier ..................... G07D 11/50 194/207 |
| 2005/0211200 A1 | 9/2005 | Liang et al. |
| 2005/0212200 A1 | 9/2005 | Van et al. |
| 2005/0240376 A1 | 10/2005 | Uwatoko et al. |
| 2005/0285323 A1 | 12/2005 | Gulbrandsen et al. |
| 2006/0122858 A1 | 6/2006 | Miles et al. |
| 2007/0006754 A1 | 1/2007 | Eckart et al. |
| 2007/0018376 A1 | 1/2007 | Sano et al. |
| 2007/0091371 A1 | 4/2007 | Sugihara |
| 2007/0264063 A1 | 11/2007 | Sano et al. |
| 2007/0296140 A1 | 12/2007 | Babanats et al. |
| 2008/0004904 A1 * | 1/2008 | Tran ..................... A61B 5/4818 705/2 |
| 2009/0037444 A1 | 2/2009 | Stapleton |
| 2010/0067071 A1 | 3/2010 | Rozenfeld et al. |
| 2010/0220343 A1 | 9/2010 | Horikawa et al. |
| 2010/0301547 A1 | 12/2010 | Prabhat et al. |
| 2011/0285874 A1 | 11/2011 | Showering et al. |
| 2011/0290851 A1 | 12/2011 | Shelton, I |
| 2012/0003024 A1 * | 1/2012 | Kaiga ...................... B65H 7/14 399/394 |
| 2012/0013957 A1 | 1/2012 | Honda |
| 2012/0141148 A1 | 6/2012 | Ohshima et al. |
| 2012/0251288 A1 | 10/2012 | Suzuki et al. |
| 2013/0010321 A1 | 1/2013 | Shen |
| 2013/0141766 A1 | 6/2013 | Iwamatsu et al. |
| 2013/0160663 A1 | 6/2013 | De |
| 2013/0170001 A1 | 7/2013 | Takahata et al. |
| 2013/0236227 A1 | 9/2013 | Hirako |
| 2013/0242355 A1 * | 9/2013 | Morita ............... H04N 1/00734 358/449 |
| 2013/0307213 A1 | 11/2013 | Adachi |
| 2014/0153070 A1 | 6/2014 | Harada et al. |
| 2014/0168731 A1 | 6/2014 | Nakayoshi et al. |
| 2014/0192386 A1 | 7/2014 | Ishida |
| 2014/0341438 A1 * | 11/2014 | Parkov ................... G07D 7/202 382/112 |
| 2015/0048566 A1 | 2/2015 | Utagawa et al. |
| 2015/0133281 A1 | 5/2015 | Hirose |
| 2015/0186760 A1 | 7/2015 | Albrecht |
| 2015/0234790 A1 | 8/2015 | Irons et al. |
| 2015/0341509 A1 | 11/2015 | Yamada |
| 2016/0026140 A1 | 1/2016 | Oomoto et al. |
| 2016/0170355 A1 | 6/2016 | Heishi et al. |
| 2016/0227181 A1 | 8/2016 | Ilic et al. |
| 2018/0295248 A1 | 10/2018 | Fielding et al. |
| 2019/0100398 A1 * | 4/2019 | Nakayoshi ......... H04N 1/00615 |
| 2019/0161299 A1 * | 5/2019 | Egawa ............... G03G 15/6561 |
| 2019/0161301 A1 * | 5/2019 | Maeyama ............. B65H 9/002 |
| 2020/0084331 A1 | 3/2020 | Hall et al. |
| 2020/0099812 A1 * | 3/2020 | Ishii ...................... B65H 7/10 |
| 2021/0075918 A1 * | 3/2021 | Tomii ................. H04N 1/00031 |

FOREIGN PATENT DOCUMENTS

| | | |
|---|---|---|
| CN | 202185902 U | 4/2012 |
| CN | 102730446 A | 10/2012 |
| CN | 102741888 A | 10/2012 |
| CN | 103685840 A | 3/2014 |
| EP | 0731596 A1 | 9/1996 |
| EP | 1862978 A2 | 12/2007 |
| JP | S62137963 A | 6/1987 |
| JP | H03292276 A | 12/1991 |
| JP | 2000246668 A | 9/2000 |
| JP | 2000263470 A | 9/2000 |
| JP | 2006091980 A | 4/2006 |
| JP | 2007238252 A | 9/2007 |
| JP | 2013173618 A | 9/2013 |
| JP | 2015180981 A | 10/2015 |
| KR | 101257206 B1 | 4/2013 |
| WO | WO-2017106856 A1 | 6/2017 |
| WO | WO-2018175631 A1 | 9/2018 |
| WO | WO-2018175644 A1 | 9/2018 |

OTHER PUBLICATIONS

U.S. Appl. No. 16/251,693 Office Action dated May 11, 2020.
U.S. Appl. No. 17/010,287 Notice of Allowance dated May 3, 2021.
Co-pending U.S. Appl. No. 17/163,680, inventors Fielding; Alex et al., filed Feb. 1, 2021.

(56) References Cited

OTHER PUBLICATIONS

U.S. Appl. No. 16/944,364 Notice of Allowance dated Feb. 18, 2021.
Co-pending U.S. Appl. No. 16/944,364, inventors Fielding; Alex et al., filed Jul. 31, 2020.
Co-pending U.S. Appl. No. 17/010,287, inventors Hall; Kevin Christopher et al., filed Sep. 2, 2020.
EP18772300.2 Extended European Search Report dated Nov. 5, 2020.
U.S. Appl. No. 16/708,700 Notice of Allowance dated Jul. 22, 2020.
U.S. Appl. No. 16/251,693 Office Action dated Nov. 30, 2020.
U.S. Appl. No. 16/944,364 Notice of Allowance dated Nov. 30, 2020.
U.S. Appl. No. 16/571,387 Notice of Allowance dated Jun. 19, 2020.
U.S. Appl. No. 16/708,700 Notice of Allowance dated Jun. 1, 2020.
EP18772475.2 European Search Report dated Nov. 23, 2020.
EP20174330.9 European Search Report dated Oct. 28, 2020.
U.S. Appl. No. 16/944,364 Notice of Allowance dated Jan. 22, 2021.
"U.S. Appl. No. 15/383,292 Notice of Allowance dated Nov. 26, 2018.".
Canon. Canon solutions america. Monochrome Digital Press brochure. 2015. Available at https://csa.canon.com/online/wcm/connect/csa/03bf465e-31c2-4ba1-a8b6-fee511a9117c/varioPrint-135-120-110-Brochure.pdf?MOD=AJPERES. Accessed on Mar. 27, 2017.
Co-pending U.S. Appl. No. 16/251,693, filed Jan. 18, 2019.
Co-pending U.S. Appl. No. 16/571,387, filed Sep. 16, 2019.
EP16876924.8 The Extended European Search Report dated Jul. 22, 2019.
International Search Report and Written Opinion dated May 22, 2017 for International PCT Patent Application No. PCT/US2016/067583.
Jacquin, O. et al., Self-aligned setup for laser optical feedback imaging insensitive to parasitic optical feedback. Applied optics, Optical Society of America, 2009, 48, pp. 64.< 10.1364/AO.48.000064>. Available at https://hal.archives-ouvertes.fr/hal-00951764. Accessed on Mar. 27, 2017.
Konica Minolta. Bizhub pro 1200/1051 specifications. Available at https://www.biz.konicaminolta.com/production/1200_1051/pdf/1200_1051catalog.pdf. Accessed on Mar. 22, 2017.
Panasonic Corp. Document Scanner—ToughFeed—Innovative Paper Feed Mechanism. Dated Feb. 6, 2017.
PCT/US2018/023626 International Search Report and Written Opinion dated Jul. 12, 2018.
PCT/US2018/023641 International Search Report and Written Opinion dated Jul. 13, 2018.
U.S. Appl. No. 15/383,292 Office Action dated Mar. 26, 2018.
U.S. Appl. No. 15/383,292 Office Action dated Sep. 19, 2018.
U.S. Appl. No. 16/007,069 Notice of Allowance dated Oct. 25, 2019.
U.S. Appl. No. 16/007,069 Office Action dated Jul. 11, 2019.
Co-pending U.S. Appl. No. 16/708,700, filed Dec. 10, 2019.
U.S. Appl. No. 16/571,387 Office Action dated Feb. 25, 2020.
Co-pending U.S. Appl. No. 17/345,953, inventors Hall; Kevin Christopher et al., filed Jun. 11, 2021.
Co-pending U.S. Appl. No. 17/412,508, inventors Fielding; Alex et al., filed Aug. 26, 2021.
U.S. Appl. No. 16/251,693 Notice of Allowance dated Aug. 13, 2021.
U.S. Appl. No. 16/251,693 Notice of Allowance dated Jul. 23, 2021.
U.S. Appl. No. 17/010,287 Notice of Allowance dated Jun. 30, 2021.
U.S. Appl. No. 17/163,680 Notice of Allowance dated Sep. 20, 2021.
U.S. Appl. No. 16/251,693 Office Action dated Jun. 4, 2021.
U.S. Appl. No. 17/010,287 Notice of Allowance dated May 18, 2021.

\* cited by examiner

MULTI-SHEET HANDLING FOR DOCUMENT DIGITIZATION

CROSS-REFERENCE

This application is a continuation application of PCT/US2018/023641, filed Mar. 21, 2018, which claims the benefit of U.S. Provisional Application No. 62/474,525, filed Mar. 21, 2017, each of which applications is entirely incorporated herein by reference.

BACKGROUND OF THE INVENTION

Traditionally, document scanning systems are provided for sheets of known size and limited quantity. For instance, double sided scanning systems traditionally receive a stack of documents of uniform size, and flip the individual sheets to scan both sides of the document. Or traditional double sided scanning systems may move pages using rollers or conveyors, over a see-through plate, so that they can be imaged from below.

Such traditional document scanning systems take a significant amount of time to scan documents, and do not readily handle documents of widely varying sizes that may be provided together. For instance, the roller/plate technique is not reliable for moving smaller sheets, since the velocity of the sheet over the plate may not be precisely controlled or known, which can lead to distortions in images.

SUMMARY OF THE INVENTION

Systems and methods are provided for handling multiple sheets for document scanning. Variances in sheets size or type may be accommodated by the systems and methods provided herein. Systems and methods may be provided to detect characteristics of the sheets to be scanned. For instance, non-vision approaches to page dimensioning may be employed. Systems and methods for document scanning may be provided. The document scanning apparatus may be capable of handling double sided sheets with variable characteristics, such as size.

In an aspect, provided is a method of measuring a characteristic of a sheet, the method comprising: providing a plurality of sheet sensors over an automated conveyance mechanism; detecting, with aid of the plurality of sheet sensors, timing of when the sheet is positioned under the plurality of sheet sensors while traversing the automated conveyance mechanism; and calculating, with aid of one or more processors, dimensions, position, or orientation of the sheet based on the detection of the timing.

In some embodiments, the plurality of sheet sensors are arranged as a substantially linear row. In some embodiments, the automated conveyance mechanism is configured to convey the sheet in a direction substantially perpendicular to the substantially linear row of the plurality of sheet sensors. In some embodiments, the automated conveyance mechanism is configured to convey the sheet in a direction that is at a non-normal angle to the substantially linear row of the plurality of sheet sensors.

In some embodiments, the plurality of sheet sensors is evenly spaced apart by a substantially uniform distance.

In some embodiments, the plurality of sheet sensors are arranged in a plurality of substantially linear rows. In some embodiments, the plurality of sheet sensors is arranged as an array. In some embodiments, the plurality of sheet sensors is arranged as a plurality of staggered rows.

In some embodiments, the automated conveyance mechanism is one or more of a conveyer belt, gravity conveyor, gravity skatewheel conveyor, wire mesh conveyor, plastic conveyor, bucket conveyor, flexible conveyor, vertical conveyor, spiral conveyor, vibrating conveyor, pneumatic conveyor, electric track vehicle system, live roller conveyor, lineshaft roller conveyor, chain conveyor, screw conveyor, overhead i-beam conveyor, dust proof conveyor, and drag conveyor.

In some embodiments, the automated conveyance mechanism comprises vacuum air flow configured to provide adhesive forces between a conveyor belt and the sheet.

In some embodiments, the one or more processors determine a width, length, thickness, diagonal, or perimeter of the sheet.

In some embodiments, the automated conveyance mechanism is configured to convey the sheet in a direction that is substantially parallel to a length of the sheet.

In some embodiments, the plurality of sheet sensors are stationary relative to an inertial reference frame.

In some embodiments, the plurality of sheet sensors are positioned above the automated conveyance mechanism to face a side of the sheet that is exposed when conveyed by the automated conveyance mechanism.

In some embodiments, at least a subset of the plurality of sheet sensors is positioned to encounter different portions along a length or width of the sheet as the sheet is conveyed across the plurality of sheet sensors. In some embodiments, at least a subset of the plurality of sheet sensors is positioned to encounter different portions along a length and width of the sheet as the sheet is conveyed across the plurality of sheet sensors.

In some embodiments, the plurality of sheet sensors are non-optical sensors. In some embodiments, the plurality of sheet sensors are ultrasonic sensors. In some embodiments, the plurality of sheet sensors are proximity sensors. In some embodiments, the plurality of sheet sensors are fiberoptic sensors.

In some embodiments, a given sheet sensor of the plurality of sheet sensors is configured to provide one of a binary signal, wherein a first signal is indicative of a presence of the sheet traversing a detection zone of the given sheet sensor, and a second signal is indicative of an absence of the sheet traversing the detection zone of the given sheet sensor. In some embodiments, detecting the timing comprises detecting a duration of the first signal.

In some embodiments, the method further comprises calculating the dimensions, position, or orientation of a second sheet adjacent to the sheet. In some embodiments, the plurality of sheet sensors are double sheet sensors.

In another aspect, provided is a document scanning apparatus comprising: a first automated conveyance mechanism comprising vacuum flow in a first direction while transporting a sheet having a first side that is exposed while transported; and a second automated conveyance mechanism comprising vacuum flow in a second direction different from the first direction while transporting the sheet having a second side that is exposed while transported, wherein the first side is scanned while transported by the first automated conveyance mechanism and the second side is scanned while transported by the second automated conveyance mechanism.

In some embodiments, the apparatus further comprises a first document digitization device configured to digitize the first side of the sheet during transportation by the first automated conveyance mechanism and a second document digitization device configured to digitize the second side of the sheet during transportation by the second automated conveyance mechanism.

In some embodiments, the first document digitization device comprises a light source configured to illuminate the first side of the sheet.

In some embodiments, the first document digitization device comprises a line scanner.

In some embodiments, the first side and the second side are scanned in sequence.

In some embodiments, the first automated conveyance mechanism and the second automated conveyance mechanism are configured to transport the sheet in the same direction.

In some embodiments, the first automated conveyance mechanism and the second automated conveyance mechanism are positioned such that the sheet simultaneously contacts both the first automated conveyance mechanism and the second automated conveyance mechanism for a duration during transportation.

In some embodiments, the first automated conveyance mechanism and the second automated conveyance mechanism are configured to transport the sheet at substantially the same speed.

In some embodiments, the first automated conveyance mechanism is one or more of a conveyer belt, gravity conveyor, gravity skatewheel conveyor, wire mesh conveyor, plastic conveyor, bucket conveyor, flexible conveyor, vertical conveyor, spiral conveyor, vibrating conveyor, pneumatic conveyor, electric track vehicle system, live roller conveyor, lineshaft roller conveyor, chain conveyor, screw conveyor, overhead i-beam conveyor, dust proof conveyor, and drag conveyor.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for handling multiple sheets for document scanning. Various aspects of the invention described herein may be applied to any of the particular applications set forth below. The invention may be applied as a document scanner or may be part of an integrated document digitization system or service. It shall be understood that different aspects of the invention can be appreciated individually, collectively or in combination with each other.

Characteristics of sheets of documents (e.g., size, orientation, location) may be detected to aid in document scanning and/or handling. Sheets may be dimensioned using any technique, including, but not limited to, non-vision page dimensioning approaches. A plurality of multi-sheet sensors may be provided. The sensors may be capable of detecting the presence or absence of a sheet. The sensors may be capable of detecting the presence or absence of multiple sheets. Optionally, the sensors may be provided in one or more rows. The sheet may be conveyed past the sensors. The sheet may pass in a direction substantially perpendicular to one or more rows of sensors. Depending on the timing of when the sensors detect the presence or absence of a single or multiple sheets, the dimensions and/or orientation of the sheet can be determined. The dimensions, orientations, and/or positions of the sheet may be determined. The dimensions, orientation, and/or positions of the sheet may be determined relative to one or more system components. For instance, the dimensions, orientation and/or positions of the sheet may be determined relative to the sensors, document scanning apparatus, line scanners, cameras, trapdoors, elevators, stackers, and/or various conveyance mechanisms, may be determined. In some embodiments, the detected characteristics of the sheet may be useful for document digitization.

The sheets may be digitized using scanning techniques. In some instances, a vacuum conveyance system may be used to allow double sided scanning of the sheets. The vacuum conveyance system may comprise a first vacuum conveyor that supports the sheet on top and a second vacuum conveyor that supports the sheet on the bottom. An upper surface of the sheet is imaged while transported by the first vacuum conveyor and a lower surface of the sheet is imaged while transported by the second vacuum conveyor, or vice versa. The sides of the sheets may be imaged in sequence.

Figure 1:
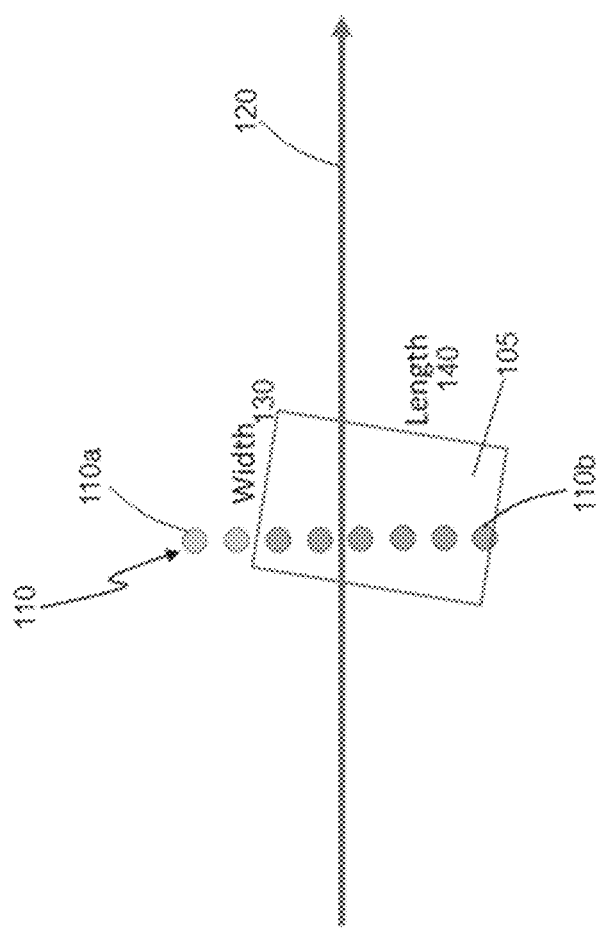
FIG. 1 provides a schematic illustration of a non-vision approach to page dimensioning, in accordance with an embodiment of the invention.

FIG. 1 provides a schematic illustration of a non-vision approach to page dimensioning, in accordance with an embodiment of the invention. A plurality of sheet sensors 110 may be provided. A sheet 105 may be conveyed by a conveyance mechanism past the sensors. The sheet may be conveyed in a travel direction 120. Dimensions of the sheet, such as a width 130 and/or length 140 may be calculated. The sheet sensors may have different states when there is no sheet detected 110*a* and when a sheet is detected 110*b*.

A document handling system may accept one or more sheets for document scanning. The sheets may be provided in any manner. For example, the sheets may be provided within one or more containers. Examples of containers may comprise boxes, cartons, barrels, pallets, crates, tanks, or any other type of containers. The physical documents may be arranged in one or more stacks within the containers. The physical documents may be provided in vertical stacks and/or horizontal stacks. The physical documents may be loosely stacked within the containers. In some instances, the physical documents may not be provided within a container. The physical documents may be provided as a stack (loose, or aligned), a pile, or in any other manner. The physical documents may be provided within one or more organizers, such as file folders (e.g., manila folders, redwells, accordion folders, pocket folders), envelopes, binders, pouches, or in any other organizational forms. Alternatively, the physical documents may be provided without one or more organizers.

The sheets may be manipulated to be ready for digitization. The documents may be removed from a container. Documents may be stacked or provided in any other desired arrangement. The documents may be separated from one another. Documents may be removed from one or more organizers. Individual sheets of documents may be separated from one another. Fasteners fastening multiple sheets of documents together may be removed. Fastened documents and/or individual sheets may be manipulated individually. For example, a single sheet may be conveyed at a time for digitization. Systems and methods provided herein may comprise an automated apparatus for manipulation of previously printed paper records in preparation for imaging for digital repositories. This may include separating grouped, attached, stacked, or bound records into individual sheets in an automated fashion. Alternatively, manual intervention may be provided at one or more stages of document preparation.

The one or more physical documents may be of any media type. The one or more physical documents within each container may be of the same media type or may include multiple media types. Examples of media types include, but are not limited to, paper, card stock, file folders, cardboard, acetate film, polyester film, X-ray film, synthetic paper, microfiche, tissue paper, blueprints, maps, cloth, or parchment. The physical documents may include sheets, business cards, envelopes, cards, or folded documents. The physical documents may also include post-its, tabs, stickers, labels, post cards, or any other item that may be part of or added onto an existing physical document. In some embodiments, one or more, two or more, three or more, four or more, five or more, six or more, seven or more, or eight or more different media types may be provided for digitization. The documents may have the same size or may have different sizes. For instance, the documents may have the same dimensions (e.g., width, length, thickness, diagonal, diameter, perimeter, or circumference). The documents may have the same shapes or may have different shapes. The documents may have the same alignment or orientation (e.g., landscape/portrait) or different alignments and/or orientations. The documents may be formed from the same material or different materials. The documents may have differing degrees of flexibility or the same degree of flexibility.

The one or more physical documents may be grouped with aid of fasteners. Examples of fasteners may include, but are not limited to, staples (e.g., ferrous metal staples, plastic staples, non-ferrous metal staples), paper clips, spring binder clips, clamps, two-prong metal pot fasteners, rings, spiral rings, brads, rubber bands, rivets, grommets, pins, ties, snaps, velcro, adhesives, tapes, or any other types of fasteners. The fasteners may be removed from the physical documents prior to digitization. In some embodiments, the fasteners may be removed in an automated fashion without requiring manual intervention prior to digitization of the documents. Individual sheets/pages of the documents may be separated from one another. The individual sheets/pages may be placed on a conveyance mechanism. The individual sheets/pages may be separated and/or placed on a conveyance mechanism using an automated apparatus. Alternatively, manual intervention may be provided.

The conveyance mechanism may transport the sheet 105 in a travel direction 120. The motion of transport of the sheet by the conveyance mechanism may be substantially lateral. Alternatively or in addition, there may be a vertical component of motion in the transport direction. The conveyance mechanism may be any type of mechanism that may transport the sheet in an automated fashion. In one example, the conveyance mechanism may be a conveyor belt. The conveyance mechanism may be part of a belt conveyor system. Other examples of conveyance mechanisms may include, but are not limited to, gravity conveyors, gravity skatewheel conveyors, wire mesh conveyors, plastic conveyors, bucket conveyors, flexible conveyors, vertical conveyors, spiral conveyors, vibrating conveyors, pneumatic conveyors, electric track vehicle systems, live roller conveyors, lineshaft roller conveyors, chain conveyors, screw conveyors, overhead i-beam conveyors, dust proof conveyors, and/or drag conveyors. The conveyance mechanism may be an automated vacuum conveyor. The conveyance mechanism may optionally comprise vacuum air flow. The vacuum flow may cause the sheet to stick to the surface of a conveyor belt. One or more openings may be provided on a surface of the conveyance mechanism that may cause airflow to flow inwards (vacuum flow) that may cause the sheet to suction onto the surface of the conveyance mechanism and not slip off. This may be useful for scenarios where the sheets are transported rapidly along the conveyance mechanism. This may help keep the sheets in place during transport and/or digitization.

The sheet may have any size. Various sheets may be transported by the conveyance mechanism and may include two or more sheets of different size. In some instances, all of the sheets may be of the same size. Alternatively, one, two, or more sheets may be of different sizes compared to other sheets. The sheets may have a dimension on the order of millimeters, centimeters, tens of centimeters, or meters. The systems and methods provided herein may be able to accommodate variations of sheet size on the order of at least 1.5×, 2×, 3×, 4×, 5×, 7×, 10×, 15×, 20×, 30×, or 50× (e.g., for length of any dimension, or area). The sheets may share any characteristics (e.g., size, material, alignment, orientation, etc.), or may have one or more characteristics that are different from one another. Dimensions of the sheet may include a width 130, length 140, thickness, diagonal, perimeter, and/or any other dimension. In some examples, the sheet may be transported such that the length of the sheet is substantially parallel to the direction of travel. In some examples, the sheet may be transported such that the width of the sheet is substantially parallel to the direction of travel. The sheet may be at any orientation relative to the direction of travel. For example, a length of the sheet may be at approximately less than or equal to about 5 degrees, 15 degrees, 30 degrees, 45 degrees, 60 degrees, 75 degrees, 90 degrees, 105 degrees, 120 degrees, 135 degrees, 150 degrees, 165 degrees, or 180 degrees relative to the direction of travel.

A plurality of sheet sensors 110 may be positioned to detect the sheet 105 when it passes by along the conveyance mechanism. The plurality of sensors may be stationary relative to an inertial reference frame (e.g., the environment). The sheet may move relative to the inertial reference frame. In some embodiments, the sheets may rest on a top surface of the conveyance mechanism. The sensors may be positioned above the conveyance mechanism. The sensors may be positioned facing a side of the sheet that is exposed when conveyed by the conveyance mechanism. When passing by the sensors, the sheet may be positioned between the sensors and the conveyance mechanism.

The sheet sensors may be provided in one or more rows. In one example, a single row of sheet sensors may be provided. The row may be substantially perpendicular to the direction of travel of the sheet. In another example, multiple rows may be provided. For instance, an array of sensors and/or staggered rows of sensors may be provided. The rows may or may not be substantially perpendicular to the direction of travel of the sheet. At least a subset of the plurality of sensors may be positioned to encounter different portions of the sheet when the sheet passes by. At least a subset of plurality of sensors may encounter different portions along the length of the sheet or the width of the sheet when the sheet passes by.

Any number of sheet sensors may be provided. In some embodiments, at least one, two, three, four, five, six, seven, eight, nine, ten, twelve, fifteen, twenty, twenty-five, thirty, forty, fifty, or more sensors may be provided. In some instances, the number of sensors may be fewer than any of the numbers provided, and/or fall within a range between any two of the number of sensors provided. The number of sensors may be provided based on a maximum dimension of the sheet. The number of sensors may be provided based on a desired density of data relating to the sheet. The sensors may be any distance apart. For instance, the sensors may be less than 0.1 cm, 0.5 cm, 1 cm, 1.5 cm, 2 cm, 2.5 cm, 3 cm, 3.5 cm, 4 cm, 5 cm, 6 cm, 7 cm, or 10 cm apart from one another center-to-center. The sensors may have a distance apart from one another greater than any of the values provided herein. The sensors may be spaced evenly apart. Alternatively, the sensors may be separated by different intervals. In some instances, the sensors may be clustered together.

The sheet sensors may be any type of double sheet sensors. The sheet sensors may utilize non-vision data to detect the double sheets. In some instances, the sheet sensors may be ultrasonic sensors or proximity sensors. The sheet sensors may utilize capacitive data to detect the sheets. In some instances, a combination of ultrasonic and capacitive information may be used to detect sheets. Ultrasonic and/or capacitive sensors may be employed to detect the difference between the presence and absence of a sheet. In some embodiments, the sensors may be fiberoptic sensors. Fiberoptic sensors may be capable of detecting and/or differentiating between an absence and a presence of a sheet. Ultrasonic and/or capacitive sensors may be employed to detect the difference between a single sheet and multiple sheets. Alternatively, the sensors may use vision-based data to sense the sheets.

The sensors may operate at any sampling rate. For example, the sensors may sample at 100 Hz. In another example, the sensors may sample at 30,000 Hz. In some embodiments, the sensors may sample at a rate of at least 10 Hz, 20 Hz, 30 Hz, 40 Hz, 50 Hz, 60 Hz, 70 Hz, 80 Hz, 100 Hz, 120 Hz, 150 Hz, 200 Hz, 300 Hz, 500 Hz, 1,000 Hz, 2,000 Hz, 5,000 Hz, 10,000 Hz, 15,000 Hz, 20,000 Hz, 25,000 Hz, 30,000 Hz, 35,000 Hz, 40,000 Hz, 50,000 Hz, 75,000 Hz, or 100,000 Hz. The sampling rates may be less than any of the values provided. The sampling rate may fall within a range between any two of the values provided. In some embodiments, high sampling rates may increase resolution at which sheets may be measured.

The sheet sensor may be in a first state 110a when there is no sheet detected. The sheet state may be in a second state 110b when a sheet is detected. The sheet sensors may provide signals that may be indicative of the presence or absence of a sheet. Based on the signals from the sensors, one or processors may be capable of calculating dimensions and/or orientation of the sheet.

Figure 2:
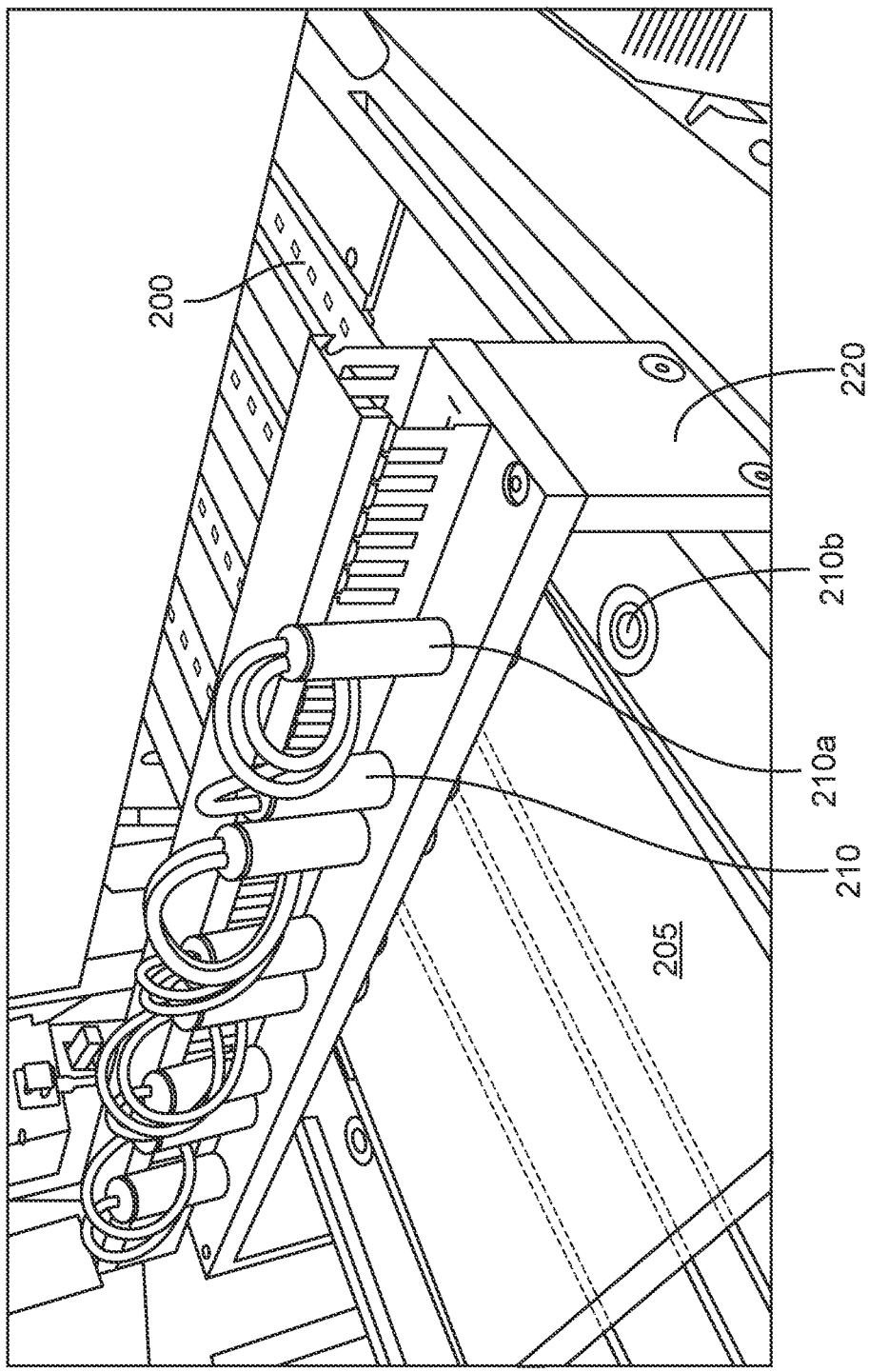
FIG. 2 shows an example of a page detection apparatus, in accordance with an embodiment of the invention.

FIG. 2 shows an example of a page detection apparatus, in accordance with an embodiment of the invention. A conveyance mechanism, such as a conveyor belt 200 may be utilized to transport a sheet 205. A plurality of sheet sensors 210 may be positioned to detect the sheet as it passes by. In some embodiments, a support structure 220 may be provided to hold the sensors in place.

In some embodiments, a conveyance mechanism that may transport sheets 205 of documents, may be a conveyor belt 200. The conveyor belt may be capable of accommodating sheets with various characteristics. The sheets may be separated and loaded onto the conveyor belt. The separation and/or loading onto the conveyor belt may occur in an automated fashion. The conveyor belt may transport the sheets past the sensors in an automated fashion. The conveyor belt may be capable of transporting sheets at a rapid rate. In some embodiments, the conveyor belt surface may be moving at approximately 0.5 m/s. Optionally, the conveyor belt may be moving at a speed of at least 0.01 m/s, 0.05 m/s, 0.1 m/s, 0.2 m/s, 0.3 m/s, 0.4 m/s, 0.5 m/s, 0.6 m/s, 0.7 m/s, 0.8 m/s. 1.0 m/s, 1.2 m/s, 1.5 m/s, 2 m/s, 3 m/s, or 5 m/s. In some instances, the conveyor belt may be moving at a speed less than any values described, or within a range between any two of the numbers described. In some instances, the sheets may be transported so that the sensors detect approximately two sheets per second. The sheets may be transported at a speed so that sensors detect at least about 1 sheet every three seconds, 1 sheet every two seconds, 1 sheet per second, 2 sheets per second, 3 sheets per second, 4 sheets per second, 5 sheets per second, 6 sheets per second, 7 sheets per second, 10 sheets per second, or 15 sheets per second. Letter sized sheets may be used as a reference for the speeds above. The conveyor belt may optionally provide vacuum suction that may keep the sheet on the surface of the conveyor belt during transport. This may prevent the sheet from slipping off during transport or moving in unpredictable ways.

The sheet may have any orientation relative to the direction of travel of the conveyor belt. For example, the sheet may be aligned with the direction of travel such that the length or width of the sheet is substantially parallel to the direction of travel (e.g., within less than or equal to about 5 degrees, 3 degrees, 2 degrees, 1 degree, 0.5 degrees, or 0.1 degrees of the direction of travel). Alternatively, the sheet may be askew, and may have any orientation relative to the direction of travel, such as any of the degree values described elsewhere herein.

The sheet may rest on top of a conveyor belt surface while transported. The sheet sensors 210 may be suspended over the conveyor belt. When the sheet passes by the sheet sensors, the sheet may be positioned between the sheet sensors and the conveyor belt surface. A structure 220 may be provided that may be used to position the sheet sensors. The structure may suspend the sensors above the conveyor belt. In some embodiments, the sensors may have a transmitter side 210a and a receiver side 210b. The transmitter side may be supported by the structure. The receiver side may be on, in, or supported by the conveyor. In some embodiments, the receiver side may be embedded in the conveyor. In some embodiments, the transmitter may be supported above a sheet of paper that is being detected, while the receiver may be supported beneath the sheet of paper that is being detected. The receiver side may be exposed when a sheet is not above the receiver. The receiver side may optionally remain exposed while the conveyor is in operation, as long as a sheet is not above the receiver. The transmitter may transmit a signal that may be received by the receiver. When a sheet is positioned between the transmitter and the receiver, the signal may be altered before reaching the receiver or may be prevented from reaching the receiver. This may allow the detection of the presence and/or absence of the sheet. In some embodiments, when multiple sheets are positioned between the transmitter and the receiver, the signal received (or not received) by the receiver may be different from when a single sheet is positioned between the transmitter and the receiver. This may allow for the differentiation between a single sheet and multiple sheets. In alternative embodiments, the sensor may not require a receiver in the conveyor. In some instances, the sensor may have a transmitter and receiver that are both supported by the structure. For example, the sensor may transmit a signal that may be reflected by the surface below (e.g., conveyor, sheet of paper). The receiver may receive the reflected signal. The received signal may be analyzed to determine the presence or absence of a sheet, and/or the presence of a single sheet or multiple sheets. A transmitter and receiver may be in electrical communication with one another. The transmitter and receiver may be in electrical communication with one or more processors that may analyze the data.

The structure may be a stationary structure that may optionally not move relative to an inertial reference frame. Alternatively, the structure may move relative to an inertial reference frame. The structure may be stationary relative to a conveyor belt support. The supporting structure may include a bar that may span the width of the conveyor belt. The sensors may be supported by the bar. The bar may support one or more rows of sensors along the width of the conveyor belt. The bar may be elevated above the conveyor belt. The bar may be supported at a single end or both ends. The bar may aid in supporting one or more electrical connectors (e.g., wires, cables) connecting the sensors to a power source. In some embodiments, each sensor may be capable of receiving power from a power source. Each sensor may communicate sensor data to one or more processors. The one or more processors may be on-board or off-board the support structure or conveyor belt. In some embodiments, separate electrical connectors may be provided for power and communications for each sensor. Alternatively, the same electrical connector may be used for both power and communications.

When the sheet sensors detect a sheet, they may produce a signal that is different from when the sheet sensors do not detect a sheet. In some instances, the sheet sensors may provide a sensory indication of whether a sheet has been detected or not. For example, the sheet sensors may provide a visual indication while a sheet is detected by the sheet sensors. The visual indications may be different when a sheet is detected and when a sheet is not detected. In one example, a sheet sensor may show a first color when not detecting a page, and may show a second color different from the first color while detecting a page. Since the pages pass by the sheet sensor, a particular sensor may be at the first color, and then switch to the second color when the sheet is first detected by the sensor. The sensor may remain the second color while the sheet is passing beneath the sensor. When the sheet is no longer under the sensor, the sensor may switch back to the first color. In another example, the sensor may be dark or unlit when there is no sheet detected, and may light up or show other visual indications when the sheet is detected. Additionally or alternatively, sheet sensors may provide auditory and/or tactile indications of when the sheet is detected by the sensors.

Figure 3:
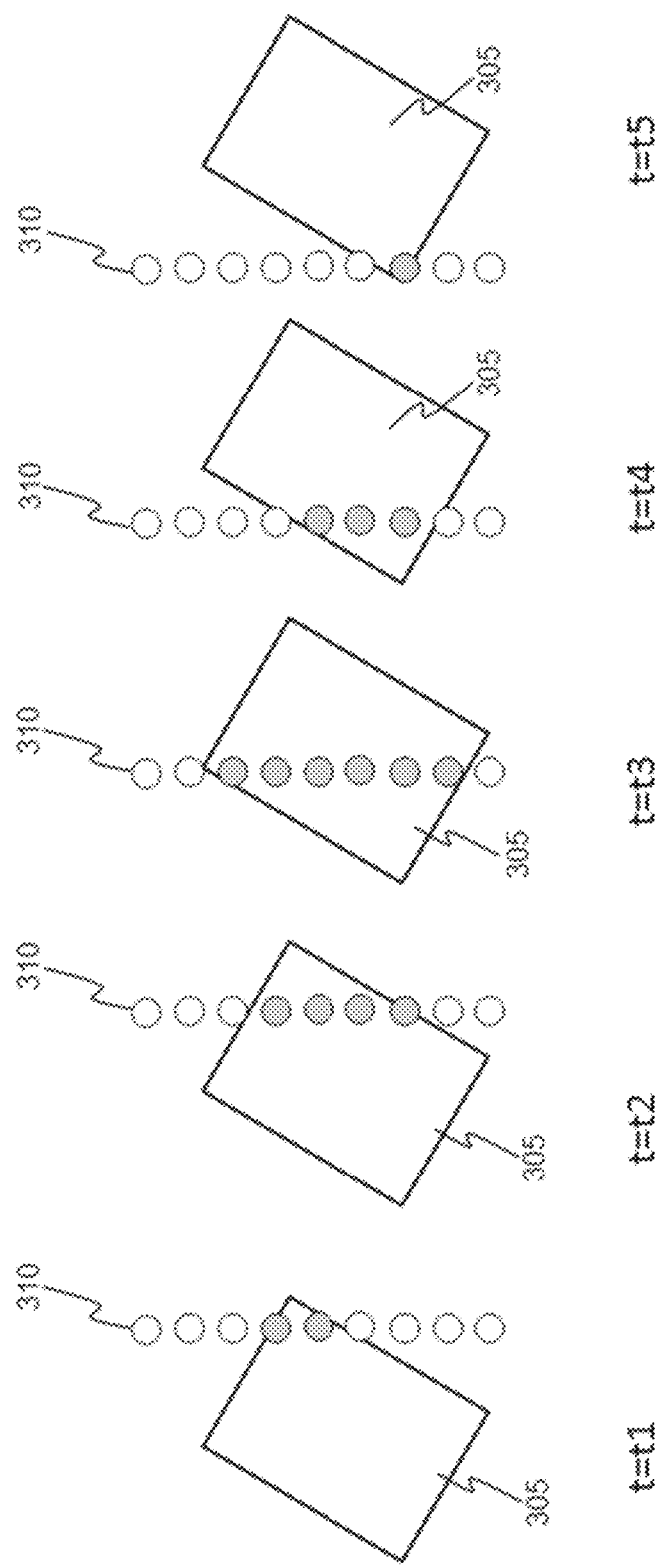
FIG. 3 provides an illustration of sensors detecting a page at different points in time, in accordance with embodiments of the invention.

FIG. 3 provides an illustration of sensors detecting a page at different points in time, in accordance with embodiments of the invention. A sheet 305 may be detected with aid of one or more sheet sensors 310. The sheet may pass by the one or more sheet sensors over a period of time. FIG. 3 provides an example of relative positioning of a sheet relative to the sheet sensors at different points in time (e.g., t1, t2, t3, t4, t5).

Providing a plurality of sheet sensors 310 allows the dimensions of the sheet 305 to be detected over time. A sheet sensor may be 'on' when the sheet sensor detects a sheet and 'off' when the sheet sensor does not detect a sheet. A sheet sensor may remain on while the sheet sensor is detecting a sheet. A sheet sensor may remain off while the sheet sensor is not detecting a sheet. A sheet sensor may remain on for a period of time that it takes the sheet to pass by the sheet sensor. Depending on the dimensions and/or orientation of the sheet, different sheet sensors may turn on at different points in time.

For example, at time t1, two of the sensors may encounter a corner of the sheet first, and may turn on, while the other sensors remain off. As the sheet passes by, at time t2, more of the sensors may turn on as a larger portion of the sheet is passing by the sensors. Similarly, at time t3, even more of the sensors may be in an on state as a central portion of the sheet is passing by the sensors. At time t4, fewer sensors may be on, as the central portion of the sheet has passed by the sensors. At time t5, a single sensor may be on as the last corner of the sheet is detected before the sheet has completely passed by. In some instance, some of the sensors may never turn on (e.g., sensors at the top and/or bottom border) if the sheet never passes by these sensors.

Depending on which sensors turn on, and timing of when the sensors turn on, the dimensions and/or orientation of the sheet may be calculated. One or more processors may calculate sheet dimensions and/or orientations depending on the sensor data. In some embodiments, the velocity of the conveyance mechanism may be known. The velocity at which the sheet is passing by the sensors may be known. Based on the velocity of the conveyance mechanism and/or sheet, the dimensions and/or orientation of the sheet may be calculated. The dimensions and/or orientation of the sheet may be calculated based on the sensor data and the known velocity of the sheet/conveyor.

The one or more processors may be on-board the conveyance mechanism, the sensors, or a device connected to the conveyance mechanism or sensors. In some embodiments, the one or more processors may be at a device in operable communication with the conveyance mechanism and/or sensors. The device may be remote to the operation communication and/or sensors.

Figure 4:
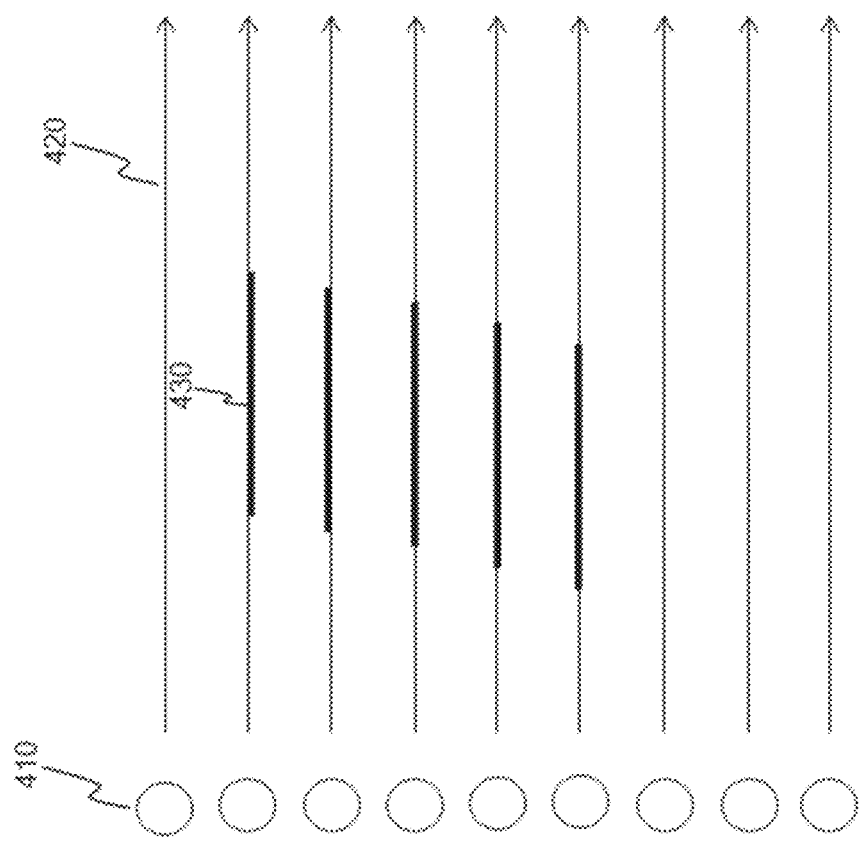
FIG. 4 provides an illustration of sensor detection of a page over time, in accordance with an embodiment of the invention.

FIG. 4 provides an illustration of sensor detection of a page over time, in accordance with an embodiment of the invention. A plurality of sensors 410 may be provided. The sensors may optionally be provided as a row. The row may be substantially perpendicular to a direction of travel of a conveyance mechanism.

A representation of the data collected by the sensors 420 over time is provided. When a sensor detects a sheet, the data may provide indication of sheet detection 430. In some embodiments, the sensors may have a 'default' state. The default state may be provided when the sensors do not detect any sheets. The sensors may enter an 'on' state. The sensors may be in an 'on' state when the sensors detect a sheet passing by.

As illustrated in FIG. 4, the sensors 410 may show a default state 420 over time, or an on state 430 for the period of time during which a sheet is detected. The times at which the sensors enter or exit an on state may be tracked. Timestamps may be collected when the sensors enter the on state and/or when the sensors exit the on state. Timestamps may be collected for when a sensor transitions from a default to an on state, and vice versa. The timestamps may have any format. In some embodiments, the timestamps may have any degree of precision. In some instances, timing (e.g., provided by timestamps), may have precision within seconds, 0.5 seconds, 0.1 seconds, 0.05 seconds, 0.01 seconds, 0.005 seconds, 0.001 seconds, 0.0005 seconds, 0.0001 seconds. A high degree of precision may be desirable when the sheets are traveling rapidly past the sensors. The high degree of precision may also be desirable when various sheet sizes, including smaller items, such as business cards, post-its, etc. are passing by the sensors. This may allow accurate calculation and detection of various sheet types, sizes, orientations, and/or locations.

As illustrated, multiple sensors may be provided. Each sensor may have timing information of when the sensors enter an on state and/or a default state. The use of multiple sensors allows the accurate detection of the dimensions and/or orientation of the sheet. For example, if n number of sensors are provided (where n is a positive whole number—e.g., 1, 2, 3, 4, 5, 6, 7, 8, 9, 10 or more), the timestamps of when (and/or if) each of then sensors turn on can be used to read the angle of the sheet (e.g., sheet orientation). Knowing the speed of the conveyance mechanism may be used to accurately read the angle of the page. For example, as illustrated, when the sensors turn on in sequence over a period of time, the sheet may be slightly tilted at an angle. If the sensors were to all turn on at the same time, the sheet may be aligned so that the leading edge is substantially perpendicular to the direction of travel.

The length of time that the sensor is in an 'on' state may be used to determine the width of the page passing by the sensors. In some embodiments, the data regarding the length of time may be provided directly by the sensor. In some instances, the length of time may be calculated as the difference in the timestamps between when the sensor exits the on state and when the sensor enters the on state. The length of time of which the sensor is on, combined with the information about the velocity of sheet travel, can be used to calculate the width of the sheet. Optionally, the angle of the page may be used in combination with the length of time at which the sensor is on, and the sheet velocity to calculate the width of the sheet.

The length of the sheet may also be calculated based on the sensor data. For example, based on the number of sensors that are turned on, the length of the sheet may be calculated. For example, as illustrated, only five of the sensors may turn on for a particular sheet. That may indicate the length of the page is somewhere between the distance taken up by five or six of the sensors. The length may be approximated based on the number of sensors that are turned on. The estimation of the length may have a precision on the order of the distance of the sensors from one another. The length of the sheet may also be calculated based on the angle of the page.

Figure 5:
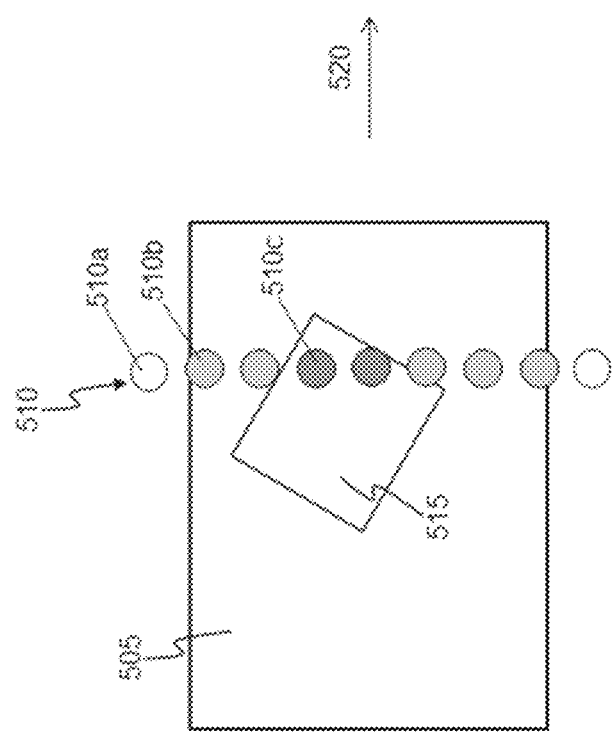
FIG. 5 provides a schematic of illustration of sensors detecting double pages, in accordance with embodiments of the invention.

FIG. 5 provides a schematic of illustration of sensors detecting double pages, in accordance with embodiments of the invention. A sheet 505 may be moving in a direction of travel 520. The sheet may be traveling with aid of an automated conveyance mechanism. The sheet may optionally have a secondary sheet 515 attached thereto. A plurality of sensors 510 may be provided, that may detect the presence of the sheet and/or secondary sheet.

A primary sheet 505 may be provided, moving in a direction of travel 520. The primary sheet may be any type of media, as described elsewhere herein. In some embodiments, the primary sheet may have a secondary sheet 515 provided therewith. The secondary sheet may be attached to the primary sheet. In some embodiments, the secondary sheet may be attached to the primary sheet with friction. The secondary sheet may be adhered to the primary sheet. The secondary sheet may or may not be attached to the primary sheet with aid of one or more fasteners. The secondary sheet may be removably attached to the primary sheet. For example, the secondary sheet may be attached with aid of a removable adhesive. For example, the secondary sheet may be a post-it note or tab that may be on the primary sheet.

The secondary sheet may or may not have the same dimensions as the primary sheet. In some embodiments, the secondary sheet may have smaller dimensions than the primary sheet. The secondary sheet may be provided on an upper surface of the primary sheet. The upper surface may be a surface of the primary sheet facing the sheet sensors. The secondary sheet may be provided on a lower surface of the primary sheet. The lower surface may be a surface of the primary sheet facing away from the sheet sensors.

One or more sheet sensors 510 may be provided. The sheet sensors may comprise double sheet sensors. The sheet sensors may be capable of detecting the presence and/or absence of a sheet. The sheet sensors may be capable of detecting and/or differentiating between two sheets and one sheet stacked on top of one another. For example, the sheet sensors may be capable of detecting and/or differentiating between no sheets, one sheet, and two or more sheets.

As illustrated a first sensor 510a may detect no sheet. A second sensor 510b may detect the presence of a single sheet. A third sensor 510c may detect the presence of multiple sheets (e.g., more than one sheet). When the sheet sensors detect a sheet, they may produce a signal that is different from when the sheet sensors do not detect a sheet. When the sheet sensors detect multiple sheets, they may provide a signal that is different from when the sheet sensors detect a single sheet or do not detect a sheet. In some instances, the sheet sensors may provide a sensory indication of whether no sheets have been detected, a single sheet has been detected, or multiple stacked sheets have been detected. For example, the sheet sensors may provide a visual indication while one sheet or multiple sheets are detected by the sheet sensors. The visual indications may be different when (1) multiple sheets are detected, (2) a single sheet is detected, and (3) no sheet is detected. In one example, a sheet sensor may show a first color when not detecting a page, and may show a second color different from the first color while detecting a single page, and may show a third color different from the first color and the second color when detecting multiple pages. Since the pages pass by the sheet sensor, a particular sensor may be at the first color, and then switch to the second color when a sheet is first detected by the sensor. The sheet may switch to a third color when multiple sheets are first detected by the sensor. The sensor may remain the respective color while the respective number of sheets are passing beneath the sensor. When no sheets are under the sensor, the sensor may switch back to the first color. In another example, the sensor may be dark or unlit when there is no sheet detected, and may light up or show other visual indications when a sheet is detected and/or when multiple sheets are detected. Additionally or alternatively, sheet sensors may provide auditory and/or tactile indications of when a single sheet or multiple sheets are detected by the sensors.

The dimensions and/or orientation of the primary sheet and/or secondary sheet may be determined with aid of the sensors. The dimensions and/or orientation of the primary sheet and/or secondary sheet may be determined based on a known velocity of the conveyance mechanism. The dimensions and/or orientation of a secondary sheet may be calculated in the same manner as the dimensions and/or orientation of a primary sheet, as described elsewhere herein.

Any description herein of being able to differentiate between a single sheet and multiple sheets may also be applied to sensors that may be capable of providing further differentiation between numbers of sheets. For instance, the sheet sensors may be able to differentiate between two sheets and three sheets stacked together. In another example, the sheet sensors may be able to differentiate between three sheets and four sheets stacked together.

In some embodiments, based on the detected sheets, further sheet handling may occur. For example, when a secondary sheet is detected, a note may be made the associated primary sheet that is being digitized that a secondary sheet was detected. The note of the presence of the secondary sheet may be associated with a digital version of the primary sheet that is scanned using a document scanning arrangement. The information regarding the secondary sheet may include information about a dimension and/or orientation of the secondary sheet.

In some embodiments, when a secondary sheet is detected, the secondary sheet may be removed. In one example, the secondary sheet may be removed as part of an automated process. An automated removal device may be used to remove the secondary sheet from the primary sheet prior to digitization of the primary sheet and/or the secondary sheet. Operation of the automated removal device may be timed based on a known location of the primary and/or secondary sheet and known velocity of the conveyance mechanism. In other instances, manual removal may be provided. Operations may be automatically slowed or suspended to allow manual removal of the secondary sheet.

In some embodiments, when a secondary sheet is detected, the primary and secondary sheets may be removed from the digitization process. The primary and secondary sheets may be moved to a separate section for handling. In one example, the conveyance mechanism may have a trapdoor that may automatically open to divert the primary and secondary sheets. The operation of the trapdoor may be timed based on the known location of the primary and secondary sheets, and the velocity of the conveyance mechanism.

Document scanning of a sheet (and/or secondary sheet) may or may not be affected by the data gathered by the sensors. In some embodiments, the known location of a sheet and the velocity of the conveyance mechanism may be useful for calculating when a sheet will arrive at a document scanning arrangement. Such information may be useful for timing the scanning. In some embodiments, known dimensions and/or orientation of the sheet may also be useful for document scanning. For instance, the document scanning system may know to when to start and stop line scanning based on the known arrival time and dimensions of the sheet. The document may know how to automatically store the scanned document based on known orientation (e.g., whether to rotate the image of the document and/or how much to rotate).

In some embodiments, the data by the sensors may be used for quality assurance. In some instances, the data from the sensors, coupled with data from the document scanning arrangement, may be used to detect and flag possible errors that may have occurred. For example, the data from the sensors may be detected prior to the sheet being scanned by the document scanning arrangement. The orientation (e.g., angle) of the sheet measured by the sensors may be compared with the angle of the sheet measured at the document scanning arrangement. Differences in orientation may be flagged to require further review. For example, if a sheet rotated by five degrees between the sensors and the document scanning arrangement, this change may be flagged as warranting review to figure out why the sheet has rotated. In another example, the document scanning arrangement may include a first document digitization device that may scan a first side, and a second document digitization device that may scan a second side. The document digitization devices may be capable of detecting an angle of the sheet. Differences in orientation of the sheet between the first and second document digitization devices may be similarly flagged. Any number of locations may be provided with sensors that may detect orientation of the sheets. This may include sensors when the documents are first received, when documents are being prepared for fastener removal and/or sheet separation, after sheet separation, or prior to, during, or after document scanning. This may include non-vision sensors and/or vision sensors that may be used to detect the orientation of the sheets. The orientation of the sheets may be tracked through one or more stages of the process. Unexpected variation in the orientation of the sheets may be flagged as reason to investigate possible error.

Figure 6:
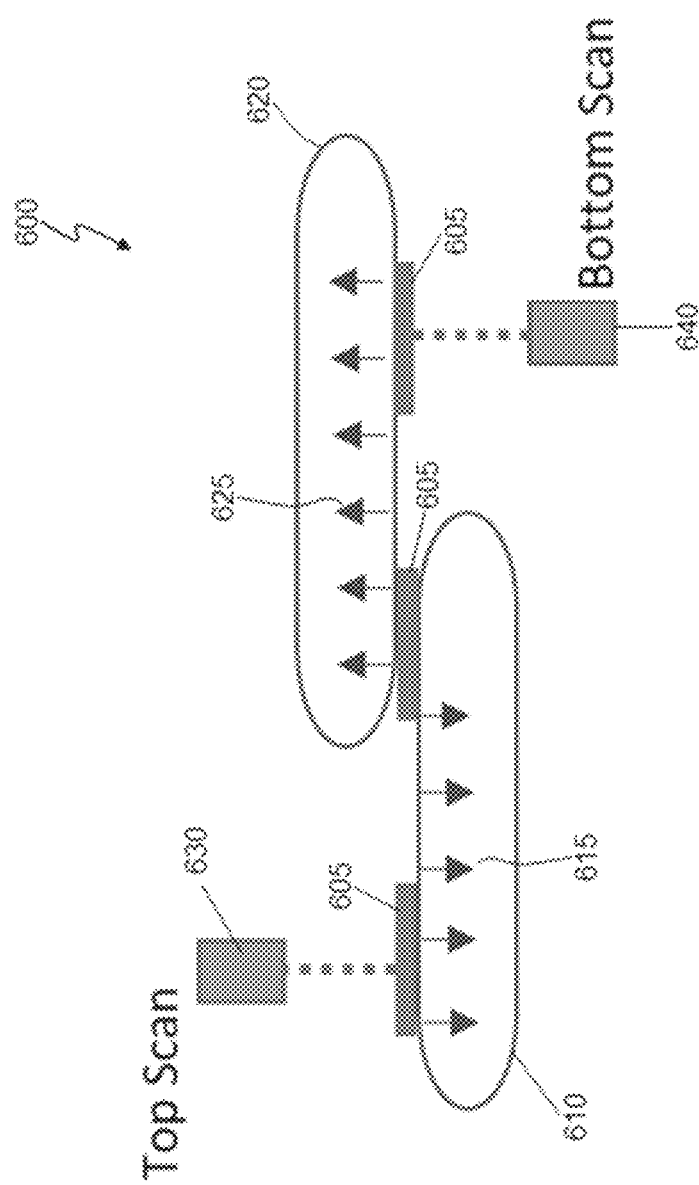
FIG. 6 provides a schematic illustration of a double sided scanning arrangement, in accordance with embodiments of the invention.

FIG. 6 provides a schematic illustration of a double sided scanning arrangement 600, in accordance with embodiments of the invention. A first automated conveyance mechanism 610 capable of transporting a sheet 605 may be provided. A second automated conveyance mechanism 620 capable of transporting the sheet may be provided. A first document digitization device 630 may digitize a first side of the sheet while the sheet is being transported by the first automated conveyance mechanism. A second document digitization device 640 may digitize a second side of the sheet while the sheet is being transported by the second automated conveyance mechanism. Optionally, the first automated conveyance mechanism may have a vacuum flow 615 in a first direction.

The second automated conveyance mechanism may have a vacuum flow 625 in a second direction.

The double sided scanning arrangement 600 as illustrated may be capable of conveying and digitizing sheets that are of various sheet sizes. For instance, the double sided scanning arrangement may be capable of digitizing sheets that are on the order of millimeters, centimeters, tens of centimeters, or hundreds of centimeters. The double sided scanning arrangement may be capable of digitizing sheets that are the sizes of business cards, post-it notes, tabs, postcards, envelopes, letter sized sheets, legal sized sheets, banners, posters, or any other size. In some embodiments, one or more of the types of sheets may be separated from other sheets prior to document scanning. For instance, one or more fasteners may be removed to allow separation of sheets. In some embodiments, selected sheet types, such as post-its or business cards (or other smaller sheets) may be separated at a similar stage to fastener separation. The smaller sheets may be removed prior to fastener separation, during fastener separation, or after fastener separation and provided on a conveyance mechanism for document scanning. This may be a separate process or the same process as the normal sheet separation of the documents. The double sided scanning arrangement may be capable of digitizing sheets of variable size without altering operation or requiring any manual interference. The double sided scanning arrangement may automatically digitize sheets of various sizes in a rapid manner without requiring any substantial variation in the speed of the digitization process. This may advantageously permit rapid high throughput digitization. For instance, various sheets may be provided, and the document scanning arrangement may be able to automatically scan them all without changing conveyance and/or digitization speed.

The double sided scanning arrangement may be capable of scanning multiple sides of a sheet. The double sided scanning arrangement may be capable of scanning both sides of a piece of paper while accommodating various characteristics of the piece of paper (e.g., size, thickness, materials). The double sided scanning arrangement may scan both sides of various types of sheets without requiring manual intervention. The double sided scanning arrangement may scan both sides of various types of sheets of paper without requiring alteration of speed or other operational characteristics.

The first automated conveyance mechanism 610 may be any mechanism capable of conveying a sheet of paper in an automated manner. For example, the conveyance mechanism may be a conveyer belt. The conveyance mechanism may be part of a belt conveyor system. Other examples of conveyance mechanisms may include, but are not limited to, gravity conveyors, gravity skatewheel conveyors, wire mesh conveyors, plastic conveyors, bucket conveyors, flexible conveyors, vertical conveyors, spiral conveyors, vibrating conveyors, pneumatic conveyors, electric track vehicle systems, live roller conveyors, lineshaft roller conveyors, chain conveyors, screw conveyors, overhead i-beam conveyors, dust proof conveyors, and/or drag conveyors. The conveyance mechanism may convey the sheets from one location to another. The conveyance mechanism may convey the sheets in a lateral direction. Alternatively or in addition, vertical component of movement may be provided. In some embodiments, the first automated conveyance mechanism may be the same conveyance mechanism that is used for detecting sheet characteristics (e.g., size, orientation). The first automated conveyance mechanism may be a single conveyor belt that spans the non-vision detection of the sheet as well the scanning of the first side of the sheet. Alternatively, separate conveyance mechanisms may be used. The separate conveyance mechanisms may be the same type of conveyance mechanism or may be different types of conveyance mechanisms. The conveyance mechanism used to collect information about the sheet may directly transfer the sheet to the first automated conveyance mechanism for document scanning. The conveyance mechanism used to collect information about the sheet may indirectly transfer the sheet to the first automated conveyance mechanism with aid of one or more intermediary devices for document scanning. Transport of the sheet from a non-vision detection station to a document scanning station may be automated. Manual intervention may not be required for the transport of the sheet from a non-vision detection station to a document scanning station.

The first automatic conveyance mechanism 610 may comprise air flow 615 in a first direction. The air flow may be a vacuum flow. The airflow may be provided by a negative pressure within the first automatic conveyance mechanism. The conveyance mechanism may comprise a surface which may support the sheet. The surface may be a belt, such as a conveyor belt. The surface may comprise one or more openings through which the air may flow. The surface may comprise one or more openings through which a vacuum may suck air into the conveyance mechanism. In some embodiments, the negative pressure that generates the vacuum flow may be lower than atmospheric pressure. In some instances, the negative pressure source may have a pressure of less than or equal to about 0.95 atm, 0.9 atm, 0.85 atm, 0.8 atm, 0.75 atm, 0.7 atm, 0.65 atm, 0.6 atm, 0.55 atm, 0.5 atm, 0.45 atm, 0.4 atm, 0.35 atm, 0.3 atm, 0.25 atm, 0.2 atm, or 0.1 atm. The negative pressure source may have a pressure greater than any of the pressure values described, or within a range between any two of the pressure values described. The direction of vacuum air flow may be substantially perpendicular to a surface of the conveyance mechanism. The direction of vacuum air flow may be substantially downwards toward the surface of the conveyance mechanism. The direction of vacuum air flow may be from the sheet towards the surface of the conveyance mechanism. A sheet supported by the conveyance mechanism may be sucked toward the surface of the conveyance mechanism. In some instances, the sheet may be sucked down onto the surface of the conveyance mechanism.

In some embodiments, the one or more openings may comprise a plurality of holes through which the vacuum flow may occur. Any number or density of openings may be provided. For instance, of the surface, at least 1%, 3%, 5%, 10%, 15%, 20%, 25%, 30%, 35%, 40%, 50%, 60%, 70%, or 80% of the area may be an opening. In some instances, less than any of the percentages listed of the area may be an opening. In some instances, at least one, two, three, five, seven, ten, 15, 20, 30, 40, 50, 70, or 100 openings may be provided per square foot of the surface.

The vacuum flow may allow the sheet to be stuck on the surface of the conveyance mechanism and not move in any undesired manner. The vacuum flow and/or friction on the surface may cause the sheet to be transported along the conveyance mechanism in a controlled manner. The vacuum flow may allow the sheet to be transported along the conveyance mechanism without slipping or falling off.

The conveyance mechanism may convey the sheets at a known velocity. The conveyance mechanism may convey the sheets at a controlled velocity. An operator of the document scanning arrangement may be able to select or specify a velocity at which the sheets may be conveyed. Alternatively, the velocity as which the sheets may be conveyed may be preset. The sheets may be transported at a substantially constant velocity while scanned. In some embodiments, the sheets may be transported at a velocity of about 0.5 m/s. The sheets may be transported at any velocity described elsewhere herein. The sheets may be traveling at a velocity greater than, less than, or at about any of the velocity values described elsewhere herein. Any sheet scanning rate, such as those described elsewhere herein, may be provided.

A first document digitization device 630 may digitize a first side of the sheet while the sheet is being transported by the first automated conveyance mechanism. The first document digitization device may be a scanner, such as a line-scan camera. The first document digitization device may comprise an encoder as feedback. The first document digitization device may scan one or more line of pixels at a time. The first document digitization device may scan individual lines of pixels while the sheet is moving. In alternate embodiments of the invention, the first document digitization device may take a snapshot of the sheet. For instance, the entire image may be captured at the same time without going line by line.

A first document digitization device may be provided with a light source that may illuminate the sheet. The light source may illuminate the sheet while the document digitization device images the document. For instance, during the duration of scanning, the light source may be on. The light source may be located near the document digitization device. The light source may be located on the same side of the conveyance mechanism as the document digitization device.

In some embodiments, the first conveyance mechanism may be a vacuum conveyor belt. The sheet may rest on a top surface of the vacuum conveyor belt. The sheet may be sucked towards the surface of the vacuum conveyor belt. A first side of the sheet may be exposed. The first side of the sheet may face away from the surface of the vacuum conveyor belt. A second side of the sheet may be facing the surface of the vacuum conveyor belt. A line scanner may be positioned above the vacuum conveyor belt. A line scanner may be positioned facing the first side of the sheet. A light source may optionally be positioned above the vacuum conveyer belt. The light source may be positioned facing the first side of the sheet. The sheet may be located between a surface of the vacuum conveyer belt, and the line scanner and/or light source.

The second automated conveyance mechanism 620 may be any mechanism capable of conveying a sheet of paper in an automated manner. For example, the conveyance mechanism may be a conveyer belt. The conveyance mechanism may be part of a belt conveyor system. Other examples of conveyance mechanisms may include, but are not limited to, gravity conveyors, gravity skatewheel conveyors, wire mesh conveyors, plastic conveyors, bucket conveyors, flexible conveyors, vertical conveyors, spiral conveyors, vibrating conveyors, pneumatic conveyors, electric track vehicle systems, live roller conveyors, lineshaft roller conveyors, chain conveyors, screw conveyors, overhead i-beam conveyors, dust proof conveyors, and/or drag conveyors. The conveyance mechanism may convey the sheets from one location to another. The conveyance mechanism may convey the sheets in a lateral direction. Alternatively or in addition, vertical component of movement may be provided. The second automated conveyance mechanism may be the same type of conveyance mechanism as the first conveyance mechanism. Alternatively, the second automated conveyance mechanism may be a different type of conveyance mechanism as the first automated conveyance mechanism. The second automated conveyance mechanism may share one or more characteristic with the first conveyance mechanism. The second automated conveyance mechanism may have one or more characteristic that is different from the first conveyance mechanism.

The second automatic conveyance mechanism 620 may comprise air flow 625 in a second direction. The second direction may be different from a first direction of airflow 615 provided for the first automatic conveyance mechanism 610. The second direction may be a direction opposite the first direction. The second direction may be parallel to the first direction. In other examples, the second direction may be perpendicular to the first direction or at an oblique angle relative to the first direction. The air flow may be a vacuum flow. The airflow may be provided by a negative pressure within the second automatic conveyance mechanism. The conveyance mechanism may comprise a surface which may support the sheet. The surface may be a belt, such as a conveyor belt. The surface may comprise one or more openings through which the air may flow. The surface may comprise one or more openings through which a vacuum may suck air into the conveyance mechanism. In some embodiments, the negative pressure that generates the vacuum flow may be lower than atmospheric pressure. In some instances, the negative pressure source may have a pressure of less than or equal to about 0.95 atm, 0.9 atm, 0.85 atm, 0.8 atm, 0.75 atm, 0.7 atm, 0.65 atm, 0.6 atm, 0.55 atm, 0.5 atm, 0.45 atm, 0.4 atm, 0.35 atm, 0.3 atm, 0.25 atm, 0.2 atm, or 0.1 atm. The negative pressure source may have a pressure greater than any of the pressure values described, or within a range between any two of the pressure values described. The direction of vacuum air flow may be substantially perpendicular to a surface of the conveyance mechanism. The direction of vacuum air flow may be substantially downwards toward the surface of the conveyance mechanism. The direction of vacuum air flow may be from the sheet towards the surface of the conveyance mechanism. A sheet supported by the conveyance mechanism may be sucked toward the surface of the conveyance mechanism. In some instances, the sheet may be sucked upwards toward the surface of the conveyance mechanism.

In some embodiments, the one or more openings may comprise a plurality of holes through which the vacuum flow may occur. Any number or density of openings may be provided. For instance, of the surface, at least 1%, 3%, 5%, 10%, 15%, 20%, 25%, 30%, 35%, 40%, 50%, 60%, 70%, or 80% of the area may be an opening. In some instances, less than any of the percentages listed of the area may be an opening. In some instances, at least one, two, three, five, seven, ten, 15, 20, 30, 40, 50, 70, or 100 openings may be provided per square foot of the surface.

The vacuum flow may allow the sheet to be stuck on the surface of the conveyance mechanism and not move in any undesired manner. The sheet may be sucked upwards onto the surface of the conveyance mechanism. The vacuum flow and/or friction on the surface may cause the sheet to be transported along the conveyance mechanism in a controlled manner. The vacuum flow may allow the sheet to be transported along the conveyance mechanism without slipping or falling off.

The conveyance mechanism may convey the sheets at a known velocity. The conveyance mechanism may convey the sheets at a controlled velocity. An operator of the document scanning arrangement may be able to select or specify a velocity at which the sheets may be conveyed. Alternatively, the velocity as which the sheets may be conveyed may be preset. The sheets may be transported at a substantially constant velocity while scanned. In some embodiments, the sheets may be transported at a velocity of about 0.5 m/s. The sheets may be transported at any velocity described elsewhere herein. The sheets may be traveling at a velocity greater than, less than, or at about any of the velocity values described elsewhere herein. Any sheet scanning rate, such as those described elsewhere herein, may be provided.

A second document digitization device 640 may digitize a second side of the sheet while the sheet is being transported by the second automated conveyance mechanism. The second document digitization device may be a scanner, such as a line-scan camera. The second document digitization device may comprise an encoder as feedback. The second document digitization device may scan one or more line of pixels at a time. The second document digitization device may scan individual lines of pixels while the sheet is moving. In alternate embodiments of the invention, the second document digitization device may take a snapshot of the sheet. For instance, the entire image may be captured at the same time without going line by line.

The second document digitization device may be the same type of digitization device as the first document digitization device. Alternatively, the second document digitization device may be a different type of digitization device as the first document digitization device. The second document digitization device may share one or more characteristic with the first document digitization device. The second automated document digitization device may have one or more characteristic that is different from the first document digitization device.

A second document digitization device may be provided with a light source that may illuminate the sheet. The light source may illuminate the sheet while the second document digitization device images the document. For instance, during the duration of scanning, the light source may be on. The light source may be located near the second document digitization device. The light source may be located on the same side of the conveyance mechanism as the second document digitization device.

In some embodiments, the second conveyance mechanism may be a vacuum conveyor belt. The sheet may rest on a bottom surface of the vacuum conveyor belt. The sheet may be sucked upwards towards the surface of the vacuum conveyor belt. The sheet may be suspended from the vacuum conveyor belt. The sheet may be suspended using the vacuum flow, and without requiring the use of additional supports or structures beneath the sheet. A second side of the sheet may be exposed. The second side of the sheet may face away from the surface of the vacuum conveyor belt. A first side of the sheet may be facing the surface of the vacuum conveyor belt. A line scanner may be positioned below the vacuum conveyor belt. A line scanner may be positioned facing the second side of the sheet. A light source may optionally be positioned below the vacuum conveyer belt. The light source may be positioned facing the second side of the sheet. The sheet may be located between a surface of the vacuum conveyer belt, and the line scanner and/or light source.

The document digitization devices may be capable of scanning in black and white, grayscale, or color. The document digitization devices may be capable of capturing images of the sheets in black and white, grayscale, or color.

A sheet 605 may be first transported by a first conveyance mechanism 610 while having a first side that is imaged. The sheet may then be transported by a second conveyance mechanism 620 while having a second side that is imaged.

In some embodiments, the sheet may rest on top of the first conveyance mechanism and be supported on a lower surface of the second conveyance mechanism. Alternatively, the reverse order may be provided where the sheet may be supported on a lower surface of the first conveyance mechanism and rest on top of the second conveyance mechanism. Although the former is described in detail, the latter may also apply. Any order may be provide that may permit both sides of the sheet to be imaged. In one example, as illustrated, the sheet may be transferred from being pulled down, to being pulled up, and thus moves by the top scan camera, and then the bottom scan camera. The sheet may be moved by one or both cameras at a known velocity. The document scanning arrangement as provided may permit both sides of the sheet to be imaged without flipping the sheet. The document scanning arrangement as provided may provide double sided scanning without changing the orientation of the sheet. The document scanning arrangement as provided may permit both sides of the sheet to be imaged without requiring the sheet to be supported by a transparent plate. The document scanning arrangement may permit both sides of the sheet without providing a substantive gap between the first conveyance mechanism and the second conveyance mechanism. The two sides of the sheet may be scanned without passing the sheet over a gap. The sheet may be traveling at a known velocity throughout the entirety of the document scanning process (e.g., while both sides are being scanned). The sheet may be traveling at a substantially constant velocity throughout the entirety of the document scanning process (e.g., while both sides are being scanned). The two sides of the sheet may be scanned in sequence. For example, a first side of the sheet may be scanned, and then the second side of the sheet may be scanned, or vice versa. Different document digitization devices may be used to scan the two sides of the sheet.

In some embodiments, there may be a portion of the document scanning arrangement where the first conveyance mechanism and the second conveyance mechanism overlap. Both the first conveyance mechanism and second conveyance mechanism may support a sheet at a point in time. In some embodiments, the first conveyance mechanism may be beneath at least a portion of the sheet while the second conveyance mechanism may be above at least a portion of the sheet, or vice versa. The first conveyance mechanism may be beneath the same portion of the sheet that the second conveyance mechanism is above at a moment in time. In some instances, at least a portion of the sheet may be sandwiched between the first conveyance mechanism and the second conveyance mechanism. In some instances, the portion of the sheet sandwiched between the first and second conveyance mechanisms may experience pressure from both sides. Alternatively, a space or gap may be provided that may permit the sheet to not experience pressure from both sides. In some embodiments, a gap distance between the first and second conveyance mechanisms may be great enough to accommodate thicker sheets coming through the system (e.g., card stock, cardboard, posterboard, foamcore, etc.). For instance, the distance may be at least 0.1 mm, 0.5 mm, 1 mm, 2 mm, 3 mm, 4 mm, 5 mm, 7 mm, or 1 cm. When a gap is provided, the transition between the first and second conveyance mechanisms may be facilitated with aid of vacuum flow. For example, the vacuum flow on the second conveyance mechanism may be sufficiently strong to pull the sheet to the second conveyance mechanism. In some instance, positive pressure may aid in the conveyance. For example, the end of the first conveyance mechanism may have airflow coming out that may push the sheet away from the first conveyance mechanism towards the second conveyance mechanism. This may be used separately or in conjunction with vacuum flow from the second conveyance mechanism. In some instances, mechanical structures may aid in moving the sheet to the second conveyance mechanism. For example, a mechanical finger may aid in pushing the sheets up to the second conveyance mechanism. In some embodiments, the arrangement may be calibrated to allow certain types of sheets to pass through to be scanned on the second side while diverting other types of sheet. For example, a thick piece (e.g., cardboard, foamcore, DVDs, etc.) may pass through into a bin while a thinner piece (e.g., sheet of paper) would be scanned. The gap and/or vacuum force may be calibrated to selectively allow certain types of sheets to be scanned while certain types are diverted. The vacuum force may be sufficiently strong to only lift certain types of sheets.

There may be at least a portion of the first conveyance mechanism that is not overlapping with the second conveyance mechanism, and vice versa.

While at least a portion of the sheet is between the first and second conveyance mechanisms, the sheet may simultaneously contact both the first and second conveyance mechanisms. Alternatively, the sheet may only contact one of the first and second conveyance mechanisms at a time. In some instances, a first vacuum flow from the first conveyance mechanism may be providing a suction force on the sheet, while a second vacuum flow from the second conveyance mechanism is also be providing a suction force on the sheet. The first vacuum flow and second vacuum flows may be provided on the same portions of the sheet at the same time. Alternatively or in addition, they may be provided on different portions of the sheet at the same time. In one example, the sheet may be supported by the first conveyance mechanism, but the first vacuum flow may not be flowing at a section where the sheet is experiencing the second vacuum flow from the second section. In other examples, the sheet may be experiencing the first vacuum flow and the second vacuum flows at the same lateral sections.

The digital versions of the documents may be stored in a records management system. The images from a first side of a sheet and a second side of a sheet may be associated with one another. The images from a first side of a sheet and second side of a sheet may be stored together in memory as part of a single sheet. The digital versions of the documents may be stored in one or more memory storage units. The digital versions may be stored in a cloud computing infrastructure. A user may be able to access the digital versions of the documents. In some embodiments, the user may be able to access the digital versions of the documents remotely.

In alternative embodiments, the first and second conveyance mechanisms may not overlap. The first conveyance mechanism may allow the sheet to directly transfer to the second conveyance mechanism or use an intermediary conveyance mechanism without overlapping.

The documents may be scanned without requiring transparent plates or other similar supports. The document digitization device may directly capture images of the document without requiring an intermediary support or layer. This may provide advantages over machines that may use rollers to pinch the sheet and image the sheet from behind as it passes over a transparent plate. The use of such types of plates or layers may cause small sheets, like business cards, that not firmly held by the conveyor as they span the gap across the plates or layers to not move in a constant manner. The plates or layers may be smooth, and the inconstant velocity may cause some degree of pixel stretching or image distortion, which may be more noticeable or have a greater impact with variable sheet sizes.

The systems and methods provided herein may accommodate imaging sheets of all sizes and even smaller than business cards. The document scanning arrangement and method may ensure constant velocity across the imaging plane, and provide a high scan quality. The vacuum flow system and described may allow sheets of all sizes to be robustly transferred and scanned with a known sheet velocity, which may result in improved scaled images.

The digital versions of the sheets may be stored at a high resolution. The high resolution may be possible with little or no distortion, due to the scanning techniques provided herein. In some embodiments, the document scanning arrangement provided herein may be able to store images with a resolution of at least 100 DPI, 200 DPI, 300 DPI, 350 DPI, 400 DPI, 450 DPI, 500 DPI, 550 DPI, 600 DPI, 650 DPI, 700 DPI, 800 DPI, 1000 DPI, 1500 DPI, 2000 DPI, or 3000 DPI.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method of measuring a characteristic of a sheet, said method comprising:
    a) providing a plurality of sheet sensors over an automated conveyance mechanism;
    b) detecting, with aid of the plurality of sheet sensors, a timing of when the sheet is positioned under the plurality of sheet sensors at a given time while traversing the automated conveyance mechanism; and
    c) calculating, with aid of one or more processors, one or more properties of the sheet selected from the group consisting of: width, length, thickness, diagonal, perimeter, dimensions, position, and orientation of the sheet, based at least partially on the detection of the timing of when the sheet is positioned under each sensor in the plurality of sheet sensors.

2. The method of claim 1, wherein the plurality of sheet sensors is stationary relative to an inertial reference frame.

3. The method of claim 1, wherein the plurality of sheet sensors are positioned above the automated conveyance mechanism to face a side of the sheet that is exposed when conveyed by the automated conveyance mechanism.

4. The method of claim 1, wherein the plurality of sheet sensors are fiberoptic sensors.

5. The method of claim 1, wherein a given sheet sensor of the plurality of sheet sensors is configured to provide one of a binary signal, wherein a first signal is indicative of a presence of the sheet traversing a detection zone of the given sheet sensor, and a second signal is indicative of an absence of the sheet traversing the detection zone of the given sheet sensor.

6. The method of claim 5, wherein detecting the timing comprises detecting a duration of the first signal.

7. The method of claim 1, further comprising calculating the dimensions, position, or orientation of a second sheet adjacent to the sheet, wherein the plurality of sheet sensors are double sheet sensors.

8. The method of claim 1, wherein the plurality of sheet sensors are non-vision sensors.

9. The method of claim 1, wherein (b) further comprises detecting the timing at a plurality of given times.

10. The method of claim 1, wherein (b) further comprises detecting a second timing of when the sheet is not positioned under the plurality of sheet sensors at a second given time while traversing the automated conveyance mechanism.

11. The method of claim 1, wherein the calculating is based at least partially on a velocity of the sheet traversing the automated conveyance mechanism.

12. A system for measuring a characteristic of a sheet, said method comprising:
   an automated conveyance mechanism configured to convey a sheet;
   a plurality of sheet sensors disposed over the automated conveyance mechanism, wherein the plurality of sheet sensors are configured to detect a timing of when the sheet is positioned under the plurality of sheet sensors at a given time while traversing the automated conveyance mechanism; and
   one or more processors configured to, based at least in part on detection of the timing of when the sheet is positioned under each sensor in the plurality of sheet sensors, determine one or more characteristics of the sheet selected from the group consisting of: a width, length, thickness, diagonal, perimeter, dimension, position, and orientation of the sheet.

13. The system of claim 12, wherein the plurality of sheet sensors are arranged in a plurality of substantially linear rows, as an array, or a plurality of staggered rows.

14. The system of claim 12, wherein the automated conveyance mechanism comprises vacuum air flow configured to provide adhesive forces between a conveyor belt and the sheet.

15. The system of claim 12, wherein at least a subset of the plurality of sheet sensors is positioned to encounter different portions along a length or width or both of the sheet as the sheet is conveyed across the plurality of sheet sensors.

16. The system of claim 12, wherein a sheet sensor of the plurality of sheet sensors is configured to provide one of a binary signal, wherein a first signal of the binary signal is indicative of a presence of the sheet traversing a detection zone of the sheet sensor, and a second signal of the binary signal is indicative of an absence of the sheet traversing the detection zone of the sheet sensor, wherein the detection of the timing comprises detection of a duration of the first signal.

17. The system of claim 12, wherein the plurality of sheet sensors are further configured to detect a second timing of when the sheet is not positioned under the plurality of sheet sensors at a second given time while traversing the automated conveyance mechanism.

18. The system of claim 12, wherein the one or more processors are further configured to determine one or more characteristics of the sheet based at least partially on a velocity of the sheet traversing the automated conveyance mechanism.

19. The system of claim 12, wherein the plurality of sheet sensors are further configured to detect the timing at a plurality of given times.

20. The system of claim 12, wherein the plurality of sheet sensors are non-vision sensors.

* * * * *